United States Patent
Sen et al.

(10) Patent No.: US 10,313,439 B2
(45) Date of Patent: Jun. 4, 2019

(54) METHODS AND SYSTEMS FOR MANAGING RESOURCES IN A NETWORKED STORAGE ENVIRONMENT

(71) Applicant: NETAPP, INC., Sunnyvale, CA (US)

(72) Inventors: Subhabrata Sen, Bangalore (IN); Deepthi Shetty, Bangalore (IN)

(73) Assignee: NETAPP, INC., Sunnyvale, CA (US)

(*) Notice: Subject to any disclaimer, the term of this patent is extended or adjusted under 35 U.S.C. 154(b) by 246 days.

(21) Appl. No.: 14/868,755

(22) Filed: Sep. 29, 2015

(65) Prior Publication Data

US 2017/0093635 A1  Mar. 30, 2017

(51) Int. Cl.
  *H04L 12/24*  (2006.01)
  *H04L 29/08*  (2006.01)

(52) U.S. Cl.
  CPC ...... *H04L 67/1097* (2013.01); *H04L 41/0896* (2013.01)

(58) Field of Classification Search
  CPC .................. H04L 67/1097; H04L 41/0896
  See application file for complete search history.

(56) References Cited

U.S. PATENT DOCUMENTS

| | | | | |
|---|---|---|---|---|
| 6,078,926 A * | 6/2000 | Jensen | ............... | G06F 17/30421 |
| 7,603,366 B1 * | 10/2009 | Gritsay | ............. | G06F 17/30595 |
| 9,535,629 B1 * | 1/2017 | DeSimone | ............ | G06F 3/0665 |
| 9,811,421 B1 * | 11/2017 | Wu | ......................... | G06F 11/14 |
| 2003/0055838 A1 * | 3/2003 | Rosen | ................ | G06F 17/30595 |
| 2003/0233439 A1 * | 12/2003 | Stone | ....................... | D04B 1/26 709/223 |
| 2009/0313288 A1 * | 12/2009 | Zhao | .................. | G06F 17/30923 |
| 2012/0150912 A1 * | 6/2012 | Ripberger | ............... | G06F 21/80 707/786 |
| 2013/0205028 A1 * | 8/2013 | Crockett | ............... | G06F 9/5027 709/226 |
| 2014/0096066 A1 * | 4/2014 | Auvenshine | ........ | G06F 9/45512 715/780 |
| 2014/0337593 A1 * | 11/2014 | Holbrook | .............. | G06F 3/0614 711/162 |

* cited by examiner

*Primary Examiner* — Nicholas R Taylor
*Assistant Examiner* — Tania M Pena-Santana
(74) *Attorney, Agent, or Firm* — Klein, O'Neill & Singh, LLP (57) ABSTRACT

Methods and systems for a networked storage system are provided. One method includes registering a resource model by a processor having a plurality of objects, each object representing a plurality of resources of a networked storage system in a same format for storing attributes of any resource type. The resource model includes a plurality of relationship objects identifying relationship types for related resources of the plurality of resources. The method includes using the resource model by the processor, to generate an empty output array for the plurality of resources by iteratively processing the relationship objects of the resource model; and dynamically populating the empty output array by the processor, in response to an application programming interface (API) request for information regarding a resource, by updating the placeholder link providing a link to the resource identified by the request.

20 Claims, 9 Drawing Sheets

METHODS AND SYSTEMS FOR MANAGING RESOURCES IN A NETWORKED STORAGE ENVIRONMENT

TECHNICAL FIELD

The present disclosure relates to networked storage environments, and more particularly, to managing information regarding resources of networked storage environments.

BACKGROUND

Various forms of storage systems are used today. These forms include network attached storage (NAS) systems, storage area networks (SANs), and others. Network storage environments are commonly used for a variety of purposes, such as providing multiple clients with access to shared data, backing up data and others.

Networked storage environments use a plurality of resources for storing and managing data for clients. Users typically desire a simple mechanism to access information regarding these resources. Continuous efforts are being made to simplify access to resource information.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for a networked storage environment are provided. One method includes generating a resource model by a processor for storing attributes of a plurality of resources used for storing data in the networked storage system having a plurality of storage devices; identifying a relationship type by the processor between related resources of the plurality of resources; storing by the processor, relationship information as an attribute of the related resources in a shell structure that includes a link for accessing information regarding each related resource and is searchable by a unique resource identifier identifying each related resource; and populating the shell structure by the processor in response to a request for resource information for a related resource by updating the link with a relationship attribute that provides information regarding a relationship that the related resource has with another resource using the updated link from the shell structure.

Figure 1A:
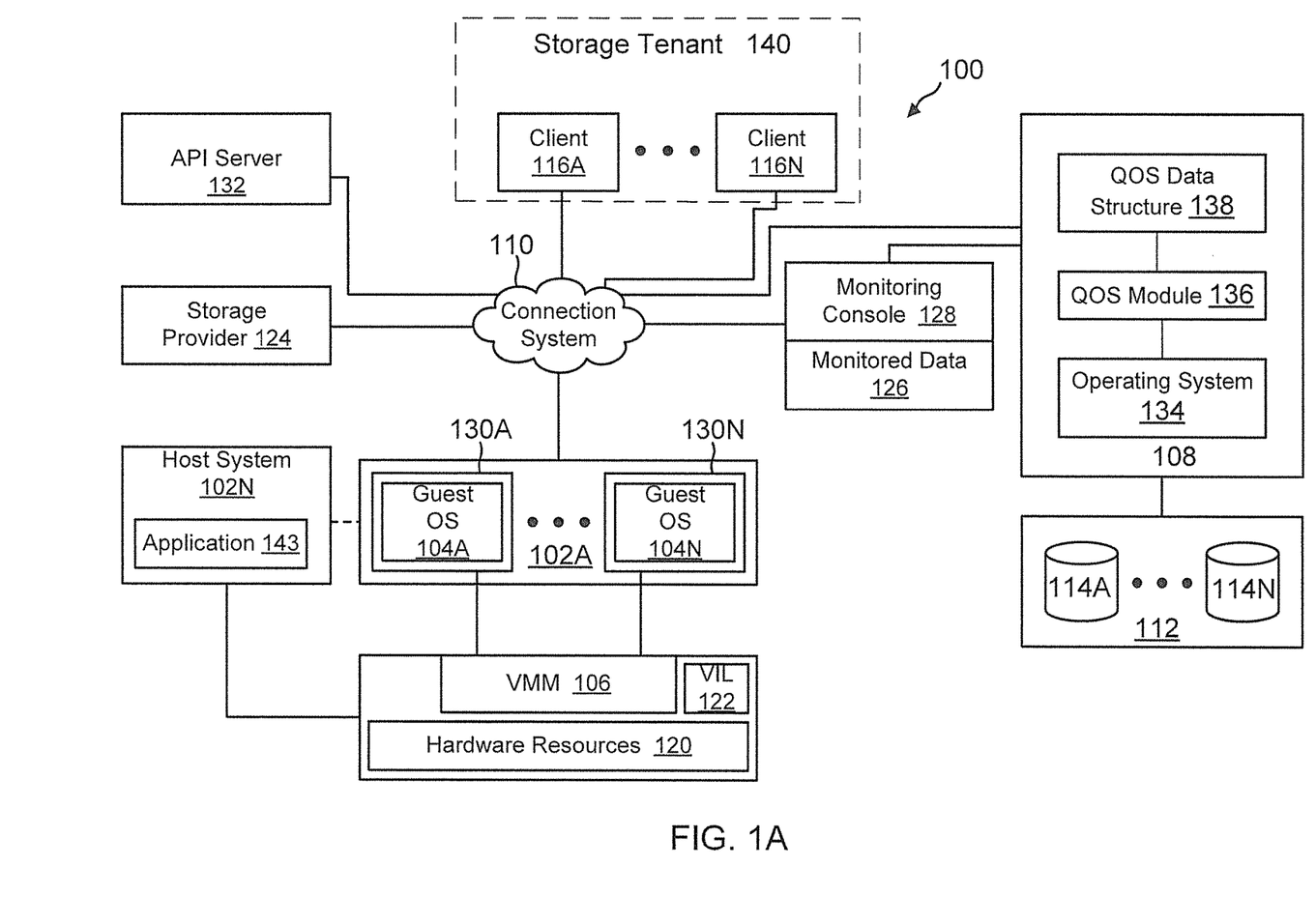
FIG. 1A shows an example of an operating environment for the various aspects disclosed herein.

System 100:

FIG. 1A shows an example of a system 100, where the adaptive aspects disclosed herein may be implemented. In one aspect, system 100 may include an application programming interface (API) server 132 and a plurality of computing devices 102A-102N (may also be referred to individually as a host platform/system 102 or simply as server 102) communicably coupled to a storage system 108 executing a storage operating system 134 via a connection system 110 such as a local area network (LAN), wide area network (WAN), the Internet and others. As described herein, the term "communicably coupled" may refer to a direct connection, a network connection, or other connections to enable communication between devices.

The API server 132 executes various modules/services for obtaining details of various resources of system 100, monitoring resource performance against specific metrics and managing events. Details regarding the API server 132 are provided below.

As an example, host system 102A may execute a plurality of virtual machines (VMs) in virtual environment that is described below in detail. Host 102N may execute one or more application 143, for example, a database application, an email application and other. The VMs and applications may be used to read and write data at the storage devices of the storage system 108.

Clients 116A-116N (may be referred to as client (or user) 116) are computing devices that can access storage space at the storage system 108. A client can be the entire system of a company, a department, a project unit or any other entity. Each client is uniquely identified and optionally, may be a part of a logical structure called a storage tenant 140. The storage tenant 140 represents a set of users (may be referred to as storage consumers) for a storage provider 124 (may also be referred to as a cloud manager, where cloud computing is being utilized). Where the storage provider 124 is being used, the client accesses storage and protection levels through the storage provider. For example, the storage provider 124 may set limits to storage space, throughput and latency for a client. It is noteworthy that the adaptive aspects of the present disclosure are not limited to using a storage provider or a storage tenant.

In one aspect, storage system 108 has access to a set of mass storage devices 114A-114N (may be referred to as storage devices 114) within at least one storage subsystem 112. The mass storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

In one aspect, the storage system 108 provides a set of logical storage volumes (or logical unit numbers (LUNs)) that presents storage space to the host systems, the storage provider 124, clients and VMs for storing information. Each volume may be configured to store data files (or data containers or data objects), scripts, word processing documents, executable programs, and any other type of structured or unstructured data. From the perspective of one of the client systems, each volume can appear to be a single drive. However, each volume can represent storage space in at one storage device, an aggregate of some or all of the storage space in multiple storage devices, a RAID group, or any other suitable set of storage space.

The storage operating system 134 organizes storage space at storage devices 114 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 114 based on a request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, one or more input/output (I/O) commands, such as a CFS or NFS request, are sent over connection system 110 to the storage system 108. Storage system 108 receives the request, issues one or more I/O commands to storage devices 114 to read or write the data and issues a CIFS or NFS response containing the requested data over the network 110 to the requesting system.

Although storage system 108 is shown as a stand-alone system, i.e. a non-cluster based system, in another aspect, storage system 108 may have a distributed architecture; for example, a cluster based system that is described below in detail with respect to FIG. 2.

System 100 may also include a monitoring console 128 that interfaces with the storage operating system 134 for sending and receiving performance data that may also be referred to as quality of service (QOS) data. QOS at the storage system level may be implemented by a QOS module 136 that maintains one or more QOS data structure (or performance data structure) 138. QOS module 136 is used to implement a guaranteed latency and/or a throughput rate for processing input/output (I/O) requests.

The term guaranteed latency as used herein means that a VM or client is guaranteed that an I/O request will be processed within certain duration. The term guaranteed throughput as used herein means a guaranteed number of IOPS (input/output operations per second) that are processed for a client. Throughput may be expressed as an absolute value or as a percentile metric (for example, a certain percentage of the total number of requests).

QOS module 136 stores QOS data at data structure 138. The data structure 138 identifies each storage volume and the associated latency and throughput. QOS module 136 provides this information to the storage operating system 134 such that storage operating system 134 can prioritize and process I/O requests based on the latency and throughput rates associated with the storage volumes. The storage operating system 134 maintains a plurality of queues (not shown) for providing QOS for each storage volume. The monitoring console 128 obtains QOS data from storage operating system 134 and stores it at a data structure 126.

It is noteworthy that although one monitoring console is shown as an example, system 100 may have different management type applications/devices that collect different data types for the various resources of system 100.

As an example, system 100 may also include a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A includes/provides a virtual machine environment executing a plurality of VMs 130A-130N that may be presented to client computing devices/systems 116A-116N. VMs 130A-130N execute a plurality of guest OS 104A-104N (may also be referred to as guest OS 104) that share hardware resources 120. Application 143 may be executed within VMs 130. As described above, hardware resources 120 may include storage, CPU, memory, I/O devices or any other hardware resource.

In one aspect, host platform 102A interfaces with a virtual machine monitor (VMM) 106, for example, a processor executed Hyper-V layer provided by Microsoft Corporation of. Redmond, Wash., a hypervisor layer provided by VMWare Inc., or any other type. VMM 106 presents and manages the plurality of guest OS 104A-104N executed by the host platform 102. The VMM 106 may include or interface with a virtualization layer (VIL) 122 that provides one or more virtualized hardware resource to each OS 104A-104N.

In one aspect, VMM 106 is executed by host platform 102A with VMs 130A-130N. In another aspect, VMM 106 may be executed by an independent stand-alone computing system, referred to as a hypervisor server or VMM server and VMs 130A-130N are presented at one or more computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1A may be customized depending on the virtual environment to implement the aspects of the present disclosure. Furthermore, VMM 106 (or VIL 122) may execute other modules, for example, a storage driver, network interface and others, the details of which are not germane to the aspects described herein and hence have not been described in detail.

Figure 1B:
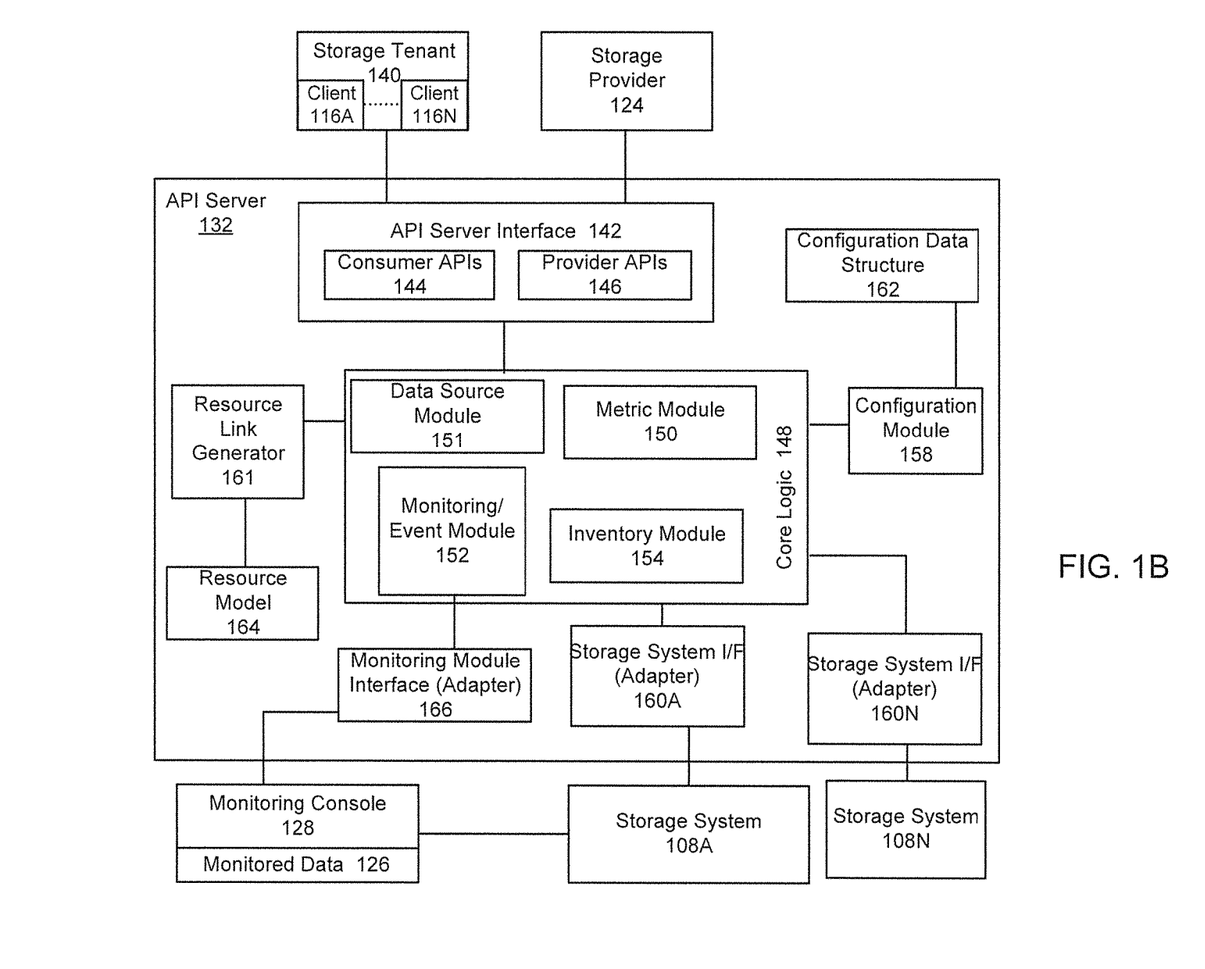
FIG. 1B shows an example of an API server used according to one aspect of the present disclosure.

API Server 132:

FIG. 1B shows an example of the API server 132 architecture, according to one aspect of the present disclosure. The API server 132 may be a stand-alone computing device or implemented as a VM at a computing device. In one aspect, API server 132 may be part of another management console.

The API server 132 include an API server interface 142 that provides consumer APIs 144 and provider APIs 146. The provider APIs are used by the storage provider 124, while the consumer APIs are used by the storage tenant 140 for sending requests. It is noteworthy that APIs 144 and 146 may be integrated into a single API as a REST API for responding to REST API requests. REST means "Representational State Transfer". REST is a scalable system used for building web services. REST systems/interface may use HTTP (hyper-text transfer protocol) or other protocols for communicating. When implemented as a REST API, the API server interface 142 receives a request and provides a response to the request.

In one aspect, the API server 132 includes core logic 148 implemented using hardware based processing logic, computer instructions and a combination thereof. Core logic 148 may also be implemented as an API.

Core logic 148 interfaces with or includes a configuration module/service 158 that stores configuration data at data structure 162. The configuration module 158 may also be implemented as an API. The configuration data may be used to store configuration information regarding different users and data sources. The term data source as used herein includes a storage system (for example, 108, 202 (FIG. 2), a computing device (for example, monitoring console 128) and other resources that are used in a networked storage environment for providing storage services. Data structure 162 may also store information regarding which drivers/adapters are to be used for interacting with a particular data source, as described below in detail.

Core logic 148 executes an inventory module (or service) 154 that is used to obtain a list and details of various resources of a networked storage environment. The inventory module 154 may communicate with storage systems 108A-108N via the storage system interface (or adapters) 160A-160N (may be referred to as adapter 160). In one aspect, different adapters' 160A-160N may be executed for interfacing with different storage system platforms (shown as 108A-108N). For example, a first adapter type may be used to interface with a FAS series storage controller provided by NetApp Inc., the assignee of this application, while a second adapter type may be provided for an E series storage controller, also provided by NetApp Inc. The storage system platforms may be provided by different vendors and may use different storage devices/technologies.

In one aspect, core logic 148 also executes a metric module/service 150 that is used to obtain operational metrics associated with a storage resource, for example, performance metrics (latency, throughput and others), capacity and others. The metric module 150 provides access to metrics data without the user having any knowledge of the underlying mechanism that is used to monitor the metrics.

Core logic 148 further includes a monitoring module (or event service) 152 that obtains event information from monitoring console 128. The monitoring module 152 may use a monitoring module interface (or adapter) 166 to communicate with the monitoring console 128 that communicates with the storage system 108 and stores monitored data in a data structure 126. In one aspect, monitoring console 128 maintains various counters to track performance and utilization of storage resources.

The core logic 148 also executes a data source module 151 that is used to collect and manage information regarding different resources at a plurality of storage platforms and computing devices (for example, storage system 108, monitoring console 128 and others). The information includes configuration information, performance metrics, events and others.

In one aspect, a resource model 164 is generated and registered with API server 132 for monitoring one or more resources of a storage system. A resource link generator 161 may be used to generate links to different resources, as described below in detail.

In one aspect, the resource model 164 captures various components of the storage system 108, for example, aggregates, clusters (described below), volumes, storage VMs and others. These different components do not exist in isolation but may be related. The relationships however may not be apparent to a client. For example, when a user obtains a volume's details (for example, name, size, type and others) conventional systems may provide names of the associated cluster and Storage VM, but details of the cluster and VM may not be easily accessible from the volume details itself. Typically, the user has to do a search for the cluster and the storage VM to obtain that information. The resource model 164 overcomes this shortcoming by providing a mechanism for easily obtaining related resource details, without having to do another search.

In one aspect, the resource link generator 161 generates HATEOAS links for the relationship between different resources. HATEOAS means "Hypertext (or Hypermedia) As the Engine Of Application State". In a REST environment, HATEOAS enables a client of a REST API to interact with objects via a uniform resource identifier (URI) or a uniform resource location (URL). A URI is a string of characters used to identify the name of a resource which enables interaction with representations of the resource over a network, typically the World Wide Web, using specific protocols.

In one aspect, the resource link generator 161 generates HATEOS links using the relationship between the various resources and stores them at resource model 164. Each resource (or entity) comprises of attributes, for example, a volume as a resource can be described by a unique 'key' (or, an identifier ('id') to uniquely identify the volume in a given namespace), 'name', 'size', 'state' (whether the volume is online or offline), an 'aggregate_key' (i.e. an identifier of a parent aggregate that includes the volume) and others. The 'aggregate_key' is an attribute that relates the 'volume' resource to the other resource, i.e. the aggregate that has its own attributes.

In one aspect, as described below in detail, the resource model 164 specifies the relationship type that may exist between two resources, for example, a composition, aggregation and association relationship type. A resource object "B" is in a "composition" relationship with a resource object "A", when B cannot exist independently and a change of status in A also affects the status of B. An example of a composition relationship is a cluster having a plurality of SVMs.

The resource object A is said to be in an "aggregation" relationship with resource B when A is composed of various resource objects including B, but B is also able to exist independently. An example of this relationship type is a storage pool that includes various storage devices but the storage devices can also exist themselves.

Objects A and B have an "association" relationship when both A and B have independent existence but use each other for a service, for example, a LUN and an iGroup (initiator group) having a plurality of initiators.

In one aspect, the resource link generator 161 uses the relationship type to automatically generate a HATEOAS link in a REST API response to a request for obtaining information regarding a resource. Before, providing details of an example resource model, the following first describes a clustered storage environment.

Figure 2:
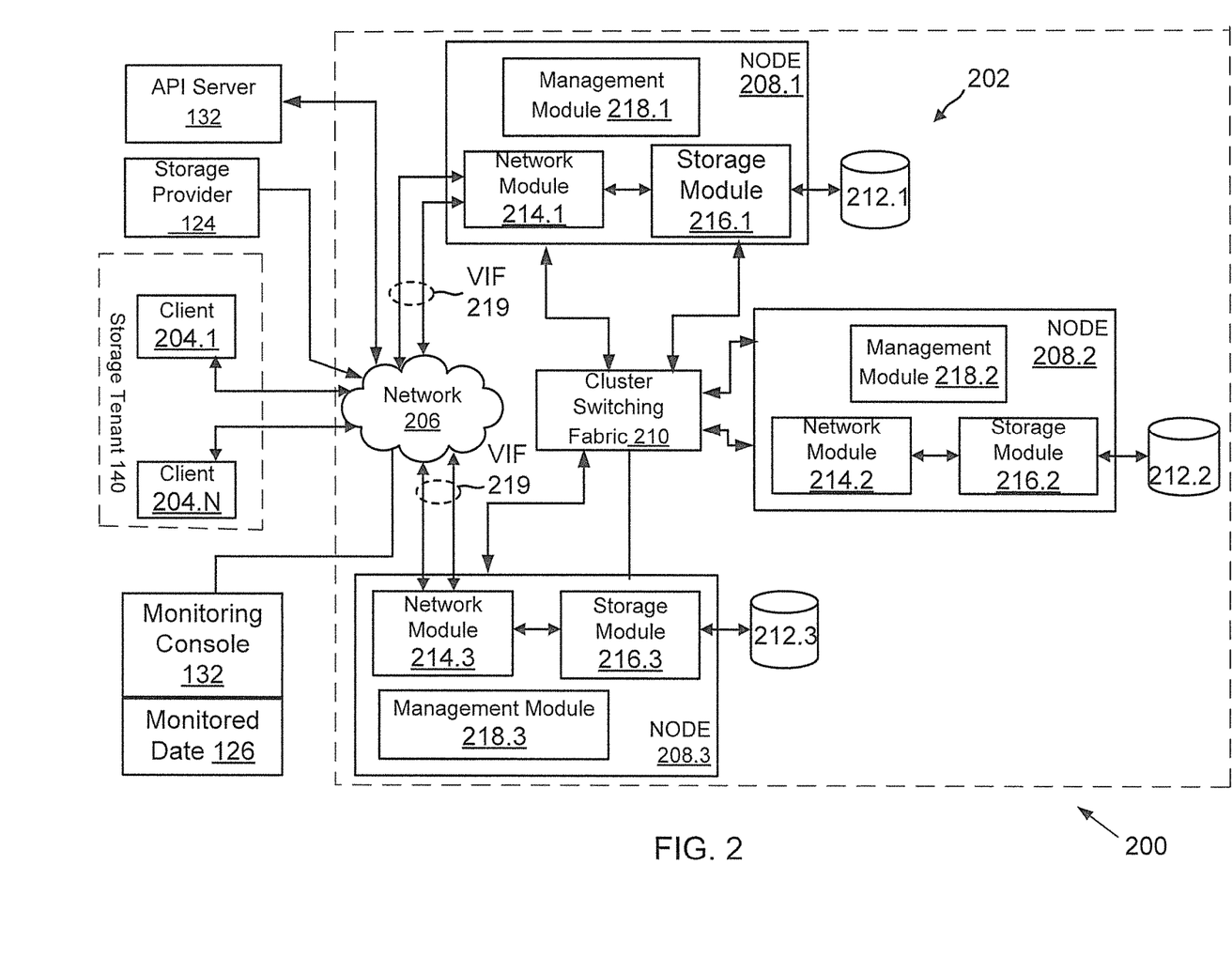
FIG. 2 shows an example of a clustered storage system, used according to one aspect of the present disclosure.

Clustered System:

FIG. 2 shows a cluster based storage environment 200 having a plurality of nodes within cluster 202 that store data on behalf of clients. System 200 also includes the API server 132 that has been described above in detail.

Storage environment 200 may include a plurality of client systems 204.1-204.N (similar to 116) as part of or associated with storage tenant 140, a clustered storage system 202 (similar to storage system 108) and at least a network 206 communicably connecting the client systems 204.1-204.N, the API server 132, the storage provider 124 and the clustered storage system 202. It is noteworthy that these components may interface with each other using more than one network having more than one network device.

The clustered storage system 202 includes a plurality of nodes 208.1-208.3, a cluster switching fabric 210, and a plurality of mass storage devices 212.1-212.3 (may be referred to as 212 and similar to storage device 114) that may be referred to collectively or individually as resources. Resources may be physical or logical (for example, a volume is a logical resource).

Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the client systems 204.1-204.N (or the API server 132, storage provider 124 and the monitoring console 128) over the computer network 206. The network modules handle file network protocol processing (for example, CFS, NFS and/or iSCSI requests). The storage modules 216.1-216.3 connect to one or more of the storage devices 212.1-212.3 and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212 and makes it available to monitoring console 128. The management modules may also be used to configure QOS values (e.g. latency and throughput) for storage volumes that are managed by a node.

A switched virtualization layer including a plurality of virtual interfaces (VIFs) 219 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs"), in which each SVM represents a single storage system namespace with separate network access. Each SVM has a client domain and a security domain that are separate from the client and security domains of other SVMs. Moreover, each SVM is associated with one or more VIFs 219 and can span one or more physical nodes, each of which can hold one or more VIFs and storage associated with one or more SVMs. Client systems can access the data on a SVM from any node of the clustered system, through the VIFs associated with that SVM.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2 depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 3A:
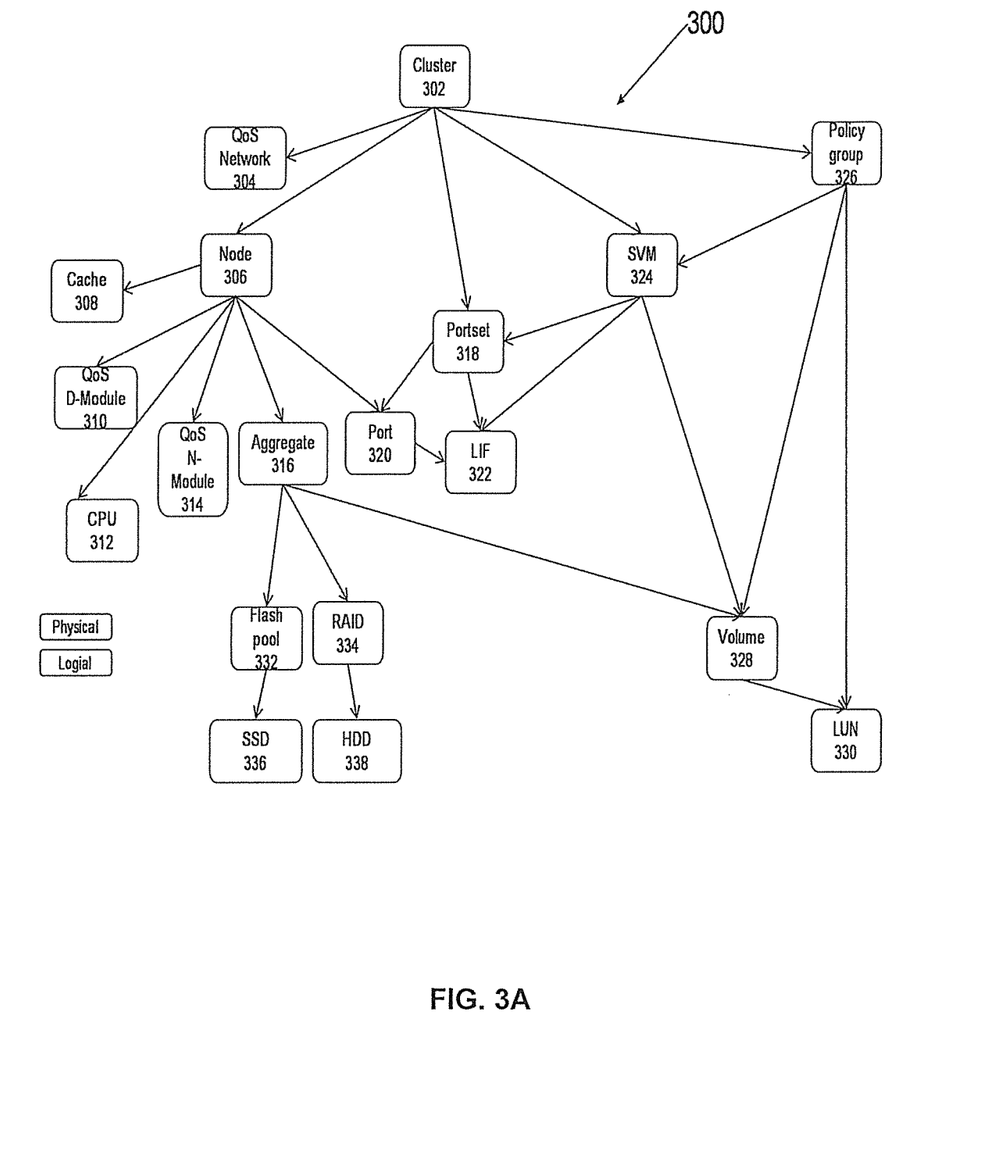
FIG. 3A shows a resource model, created and used according to one aspect of the present disclosure.

Resource Model:

FIG. 3A shows an example of a structure of a resource model 300 (or 164) for tracking information regarding different resources that are used within a clustered storage system (for example, 202, FIG. 2). Each resource has a plurality of attributes and is identified by a unique resource identifier value (or resource key). It is noteworthy that the resource model varies based on the storage system type and/or the vendor that provides the hardware/software for the storage system. Therefore, API server 132 may store multiple resource models with appropriate adapters to obtain information regarding the various resources.

In one aspect, the resource model 300 may be implemented using the "JSON" format. JSON means Javascript Object Notation that uses a text format and is platform independent. JSON is built on a collection of name/value pairs and an ordered list of variables. A JSON object is an unordered set of name/value pairs. An object begins with a {(left brace) and ends with} (a right brace). Each name is followed by: (colon) and the name/value pairs are separated by, (comma). An array is an ordered collection of values. An array begins with [ (left bracket) and ends with] (right bracket). Values are separated by "," (comma). A value can be a string in double quotes, or a number,
or true or false or null, or an object or
an array. A string is a sequence of zero or more Unicode characters, wrapped in double quotes, using backslash escapes. A character is represented as a single character string.

Resource model 300 may be hierarchical in nature where various objects may also have parent-child, peer and remote peer relationships, as described below. As an example, a cluster object 302 that may be categorized as a root object type for tracking cluster level resources. The cluster object 302 is associated with various child objects, for example, a node object 306, QOS network object 304, a portset object 318, a SVM object 324 and a policy group 326. The cluster object 302 stores information regarding the cluster, for example, the number of nodes it may have, information identifying the nodes; and any other information.

The QOS network object 304 is used to monitor network resources, for example, network switches and associated bandwidth used by a clustered storage system.

The cluster node object 306 stores information regarding a node, for example, a node identifier and other information. Each cluster node object 306 is associated with a pluralities of child objects, for example, a cache object 308, a QOS object for a storage module 310, a QOS object for a network module 314, a CPU object 312 and an aggregate object 316. The cache object 308 is used to track utilization/latency of a cache. The QOS storage module 310 tracks the QOS of a storage module defined by a QOS policy data structure. The QOS network module object 314 tracks the QOS for a network module. The CPU object 312 is used to track CPU performance and utilization of a node.

The aggregate object 316 tracks the utilization/latency of a storage aggregate that is managed by a cluster node. The aggregate object may have various child objects, for example, a flash pool object 332 that tracks usage of a plurality of flash based storage devices (shown as "flash pool"). The flash pool object 332 may have a solid state storage device (SSD) object 336 that tracks the actual usage of specific SSD based storage devices. The RAID group 334 is used to track the usage of storage devices configured as RAID devices. The RAID object 334 includes a storage device object 338 (shown as a HDD (hard disk drive) that tracks the actual utilization of the storage devices.

Each cluster is provided a portset having a plurality of ports that may be used to access cluster resources. A port includes logic and circuitry for processing information that is used for communication between different resources of the storage system. The portset object 318 tracks the various members of the portset using a port object 320 and a logical interface (LIF) object 322. The LIF object 322 includes a logical interface, for example, an IP address, while the port object 320 includes a port identifier for a port, for example, a world-wide port number (WWPN). It is noteworthy that the port object 320 is also a child object of node 306 that may use a port for network communication with clients.

A cluster may present one or more SVMs to client systems. The SVMs are tracked by the SVM object 324, which is a child object of cluster 302. Each cluster is also associated with a policy group that is tracked by a policy group object 326. The policy group 326 is associated with SVM object 324 as well as storage volumes and LUNs. The storage volume is tracked by a volume object 328 and the LUN is tracked by a LUN object 330. The volume object 328 includes an identifier identifying a volume, size of the volume, clients associated with the volume, volume type (i.e. flexible or fixed size) and other information. The LUN object 330 includes information that identifies the LUN (LUNID), size of the LUN, LUN type (read, write or read and write) and other information.

In one aspect, the resource model may also maintain relationships between the various resources as a JSON object. For example, the following shows an example of the relationship object between an aggregate and a disk:

---

AggregateDiskRelationship.json

```
{
"title": "AggregateDiskRelationship",
"description": "",
"type": "object",
"properties": {
"key": {
"description": " ",
"type": "string",
},
"aggregate_key": {
"description": " ",
"type": "string",
"ref": {
"name": "aggregate",
"object": "Aggregate",
"type": "association"
}
},
"disk_key": {
"description": " ",
"type": "string",
"ref": {
"name": "disk",
"object": "Disk",
"type": "association"
}
}
```

---

As shown above, the relationship type is an "association" between a disk and an aggregate.

The following shows an example of a relationship object for a LUN map and a Node object:

---

LunMapNodeRelationship.json

```
{
"title": "LunMapNodeRelationship",
"description": "",
"type": "object",
"properties": {
"key": {
"description": " ",
"type": "string"
},
"lunmap_key": {
"description": " ",
"type": "string",
```

```
LunMapNodeRelationship.json

"ref": {
    "name": "lunmap",
    "object": "LunMap",
    "type": "association"
}
},
"node_key": {
    "description": " ",
    "type": "string",
    "ref": {
        "name": "node",
        "object": "Node",
        "type": "association"
    }
}
}
```

The following shows an example of a storage VM and aggregate relationship object.

```
StorageVMAggregateRelationship.json

{
"title": "StorageVMAggregateRelationship",
"description": "",
"type": "object",
"properties": {
"key": {
    "description": " ",
    "type": "string"
},
"storage_vm_key": {
    "description": " ",
    "type": "string",
    "ref": {
        "name": "storagevm",
        "object": "StorageVM",
        "type": "association"
    }
},
"aggregate_key": {
    "description": " ",
    "type": "string",
    "ref": {
        "name": "aggregate",
        "object": "Aggregate",
        "type": "association"
    }
}
}
```

It is noteworthy that the foregoing objects are shown as an example and other formats may be used to store resource and relationship information.

In one aspect, the resource link generator 161 generates HATEOAS links for any resource and its relationship with another object. In one aspect, the resource link generator 161 first generates a hashmap with resource model (also referred to as a storage model) resource names as hash keys and a list of HATEOS links with placeholders for actual related resource key values corresponding to the resource used as a hashmap key. This aspect of the process may be executed when the storage system 202 is installed i.e. when the resource model 300 is developed.

After the hashmap is generated, an API request may be received for information for example, a "GET" request using the HTTP protocol. The resource link generator 161 takes the request details and the foregoing empty or "shell" hashmap and generates the appropriate HATEOS link. Both portions of this process are described below with respect to FIGS. 3B-3C.

Figure 3B:
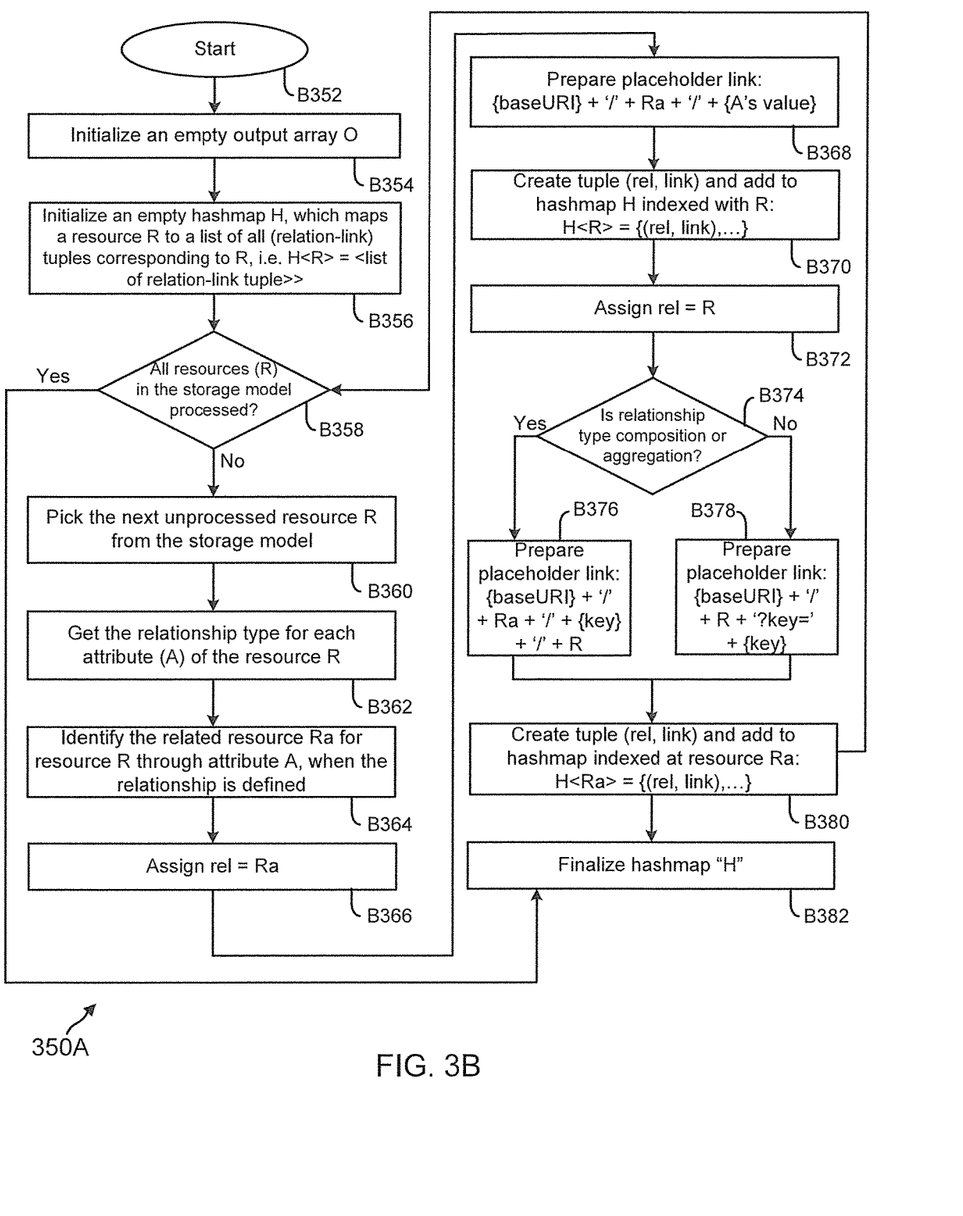
FIGS. 3B-3C show process flows for generating links for accessing resource information, according to one aspect.
Figure 3C:
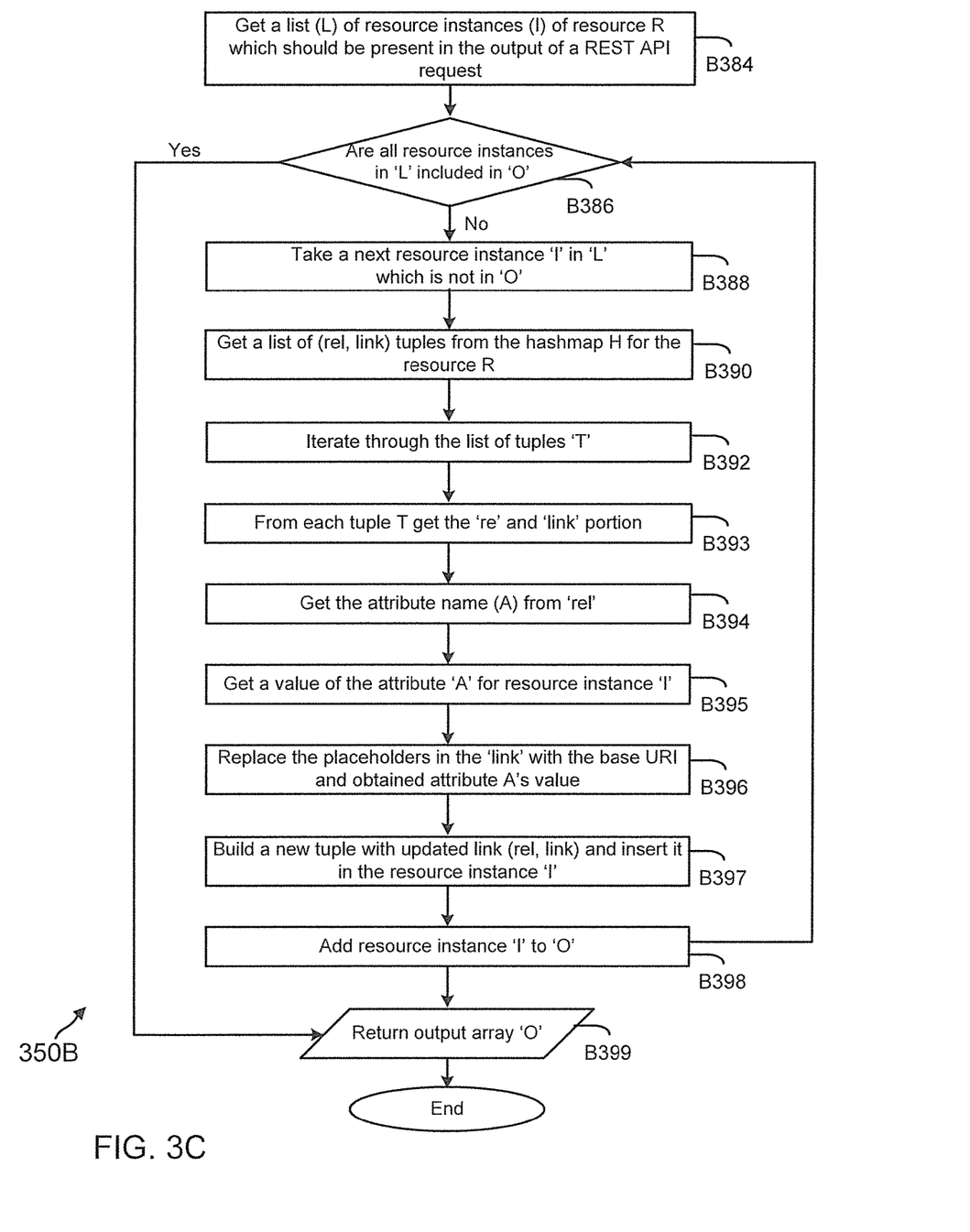

Process Flow:

FIGS. 3B-3C show a process 350 (350A and 350B) for first generating an empty hashmap with base HATEOS links, and then populating the hashmap and updating the links with relationship attributes, in response to an API request, according to one aspect of the present disclosure. The term hashmap as used herein means a hash table of a data structure used to implement an associative array, a structure that can map hash keys to certain values. A hashmap uses a hash function to compute index Into an array of buckets or slots, from which a desired vale can be found. The first part of process 350 is shown as 350A in FIG. 3B for generating the empty hashmap that may be represented as H: Resource Name→{HATEOAS links with placeholders} from the resource model 300. Process 350A of FIG. 3B will use the following inputs and then generate an output "O".

Input for process 350A: Resource model 300 may be represented as a set (S) of resources (R) where each resource may have a set of attributes (A). Thus, (S)={R1, R2, . . . , Rn|Rx represents a resource and x is an integer and n is the number of resources in set S}; and Resource (Rx)={Ax(1), Ax(2), . . . , Ax(m)|Ax(k) represents an attribute of resource Rx and k is an integer}, and attribute (Ax(1))={data_type, relationship_type|"data_type" is long, integer, float, string, Boolean and others; and "relationship_type"=none, composition, aggregation or association}. These different relationships have been described above in detail.

Output, O of Process 350A: A hashmap with a key as resource name and value as the list of HATEOAS links (base uniform resource indicators (or URIs) with placeholders for actual values of applicable attributes of the resource is generated. Thus, the hashmap may be represented as:

H [Rx]={(Relz, Linkz)|Relz is the name of the relationship and Linkz is the HATEOAS link, both corresponding to attribute Az of Rx such that Az is a relationship attribute with relationship_type !=none}

Process 350B of FIG. 3C is for adding/updating HATEOAS links in a response to a request for information. Process 350B uses the following inputs and generates the output described below.

Input: The hashmap (H) obtained from process 350A and the actual response (Res) without specific HATEOAS links containing name-value pair for each of the attributes of the resource (R).

A response (Res) may be represented as:

Res={I1, I2, . . . , Iz|Ix is an instance of resource R, x is an integer and z is the number of instances of R in the response}, and Resource instance Ix={(A, A_value)|A is an attribute of resource R and A_value is the value of A in the resource instance Ix of R}

Output: Updated response (O) with HATEOAS links and other details (attribute-value pairs) of the resource instances. For example, output (O)={Lx+Ix|Ix is an instance of resource R and Lx is the list of all HATEOAS link applicable for a resource instance Ix, and x is an integer less than or equal to the number of resource instances in Res (defined above)}.

Referring now to FIG. 3B, process 350A begins in block B352 when a storage system 108 with a plurality of resources may have been installed and initialized. Process blocks B354-B382 may be executed by the resource link generator 161 or any other module of the storage system 108.

In block B354, an empty output array O is initialized. Array O has been defined above. In block B356, an empty hashmap H, defined above, is created/initialized. The hashmap maps a resource R to a list of all relation-link tuples corresponding to R, such that H<R>=<list of relation-link tuple>.

In block B358, the process determines if all the resources of the storage model have been processed. If yes, the process moves to block B382, described below.

If not all the resources have been processed, then the next unprocessed resource, R, is selected from the resource model in block B360.

In block B362, the relationships type for each attribute (A) of the resource is obtained in block B362. When the relationship is defined, in block B364, one or more related resource Ra is identified. The related resource is identified using the attribute A.

In block B366, the relationship is assigned/designated as Ra. In block B368, a place holder link is prepared. An example of a place holder link is: {baseURI}+"/"+Ra+"/"+ (A's value). In this case the base URI and A's value are place holders that are filled during process 350B.

In block B370, a tuple (rel,link) is created and added to the hashmap H indexed with R, such that: H<R>= {(rel,link), . . . }. Thereafter, in block B372, the relation is assigned to R.

In block B374, the process determines if the relationship type is a composition or aggregation. If yes, then in block B376, a placeholder link: {base URI}+"/"+Ra+"/"+{key}+ "/"+R is generated.

If not, then in block B378, a placeholder link is generated for: {base URI}+"/"+Ra+"?key"=+{key}

In block B380, a tupple (rel,link) is created and added to the hashmap indexed at resource Ra such that H<Ra>{(rel, link), . . . }. Thereafter, the hashmap is finalized in block B382 for process 350B when relationship details are added based on an API request, as described below with respect to blocks B384-B399 of FIG. 3C.

In block B384, the resource link generator 161 obtains the list (L) of resource instances (I) of resource R that need to be provided in an output of a REST API request. The list varies based on the nature of the REST API request. The output of the request is designated as "O". In block B386, the resource link generator 161 first determines if all the instances are included in O. If yes, the process moves to block B399, when the output array is returned as a response to the request.

When all the resource instances are not included, then in block B388, the resource link generator 161 retrieves the instance that is not included. In block B390, the resource link generator 161 obtains the list of (rel,link)tuples from the hashmap H for the resource R.

In block B392, the resource link generator 161 iterates through the list of tuples "T". From each tuple, "T", in block B393, the "rel" and "link" portions are obtained.

In block B395, the value for the attribute "A" for the resource instance is obtained in block B395. In block B396, the placeholders with the link is replaced with the base URI and the attribute, A's value. In block B397, a new tuple with the updated (rel,link) is generated and is inserted for the resource instance. The instance is added to the output array O and the process reverts back to block B386. Once all the instances are added, the output array O is provided in response to the API request. Thereafter, the process ends.

Process 350A may also be represented by the following process blocks or pseudo-code executed by the API server 132, hardware based processing logic:
Create an hash map H
For i=1 to n//where n is the number of resources in storage model S defined above
R=S[i]//S[i] returns the ith resource in S
m=get_number_of_attributes(R)//assuming we use "get_number_of_attributes", which returns how many attributes are there in R
for j=1 to m
A=R[j]//R[j] returns the jth attribute in resource R
relationship_type=get_relationship_type(A)//get_relationship_type( ) returns the relationship_type of attribute A in resource R
if relationship_type='composition' or 'aggregation' or 'association'
Rx=get_related_resource(A)//get_related_resource( ) returns the resource (Rx) related to resource R through attribute A, usually removes the suffix '_key' from attribute name. For example, if A=cluster_key, Rx=cluster.
rel=Rx
link=baseURI+'/'+Rx+'/'+A_value//baseURI and A_value are placeholders. Replace Rx with the plural form of Rx
list=H[R]//H[R] returns the list of HATEOAS links for resource R. Initially this list is NIL (not created)
addHATEOASLink(list, rel, link)//addHATEOASLink( ) adds a rel (second param) and link (third param) as a tuple to a given list (first param). If the list is NIL, it first creates an empty list
H[R]=list//assign the updated list back to the hash map
if relationship_type='composition' or 'aggregation' rel=R
link=baseURI+'/'+Rx+'/'+A_value+'/'+R//baseURI and A_value are placeholders. Replace R and Rx with the plural forms of R and Rx
list=H[Rx]//get the list of HATEOAS links for the related resource Rx
addHATEOASLink(list, rel, link)
H[Rx]=list
if relationship_type="association"
rel=R
link=baseURI+'/'+R+'?'+A+'+'+A_value//baseURI and A_value are placeholders. Replace R with the plural form of R
list=H[Rx]//get the list of HATEOAS links for the related resource Rx
addHATEOASLink(list, rel, link)
H[Rx]=list
Return H Process 350B may also be represented by the following structure/process blocks or pseudo-code executed by the API server 132, hardware based processing logic:
list=H[R]//Get the list of HATEOAS rel-link tuples for the given resource R from process 350A
for i=1 to z//where z is the number of resource instances in Res
I=Res[i]//Res[i] returns the ith resource instance in Res
O[i]=I
for j=1 to t//t is the number of tuples in list
T=list[j]//returns the jth tuple (T) from the list rel=get_rel (T)//returns the 'rel' part (first parameter in the tuple) of T
A=get attribute(rel)//returns the attribute (A) corresponding to 'rel'. Usually, appends '_key' as suffix to 'rel'. For example, if rel=cluster, A=cluster_key
value=get_attribute_value(I, A)//returns the value of attribute A (second parameter) from the resource instance I (first parameter).
link=get_link(T)//returns the 'link' part (second parameter in the tuple) of T
updated_link=replacePlaceholders(link, baseURI, value)//replaces the placeholders for baseURI and A_value in the link (first parameter) with the provided baseURI (second parameter) and value (third parameter) respectively.

T=(rel, updated_link)//define tuple T with the updated link addTuple(O[i], T)//adds tuple T (second parameter) to resource instance O[i]

Return O

In one aspect, by maintaining the shell hashmap for the different resources and dynamically adding resource and resource relationship attributes/links enables API server to provide live information regarding the various resources that are deployed in networked storage environments.

Figure 4A:
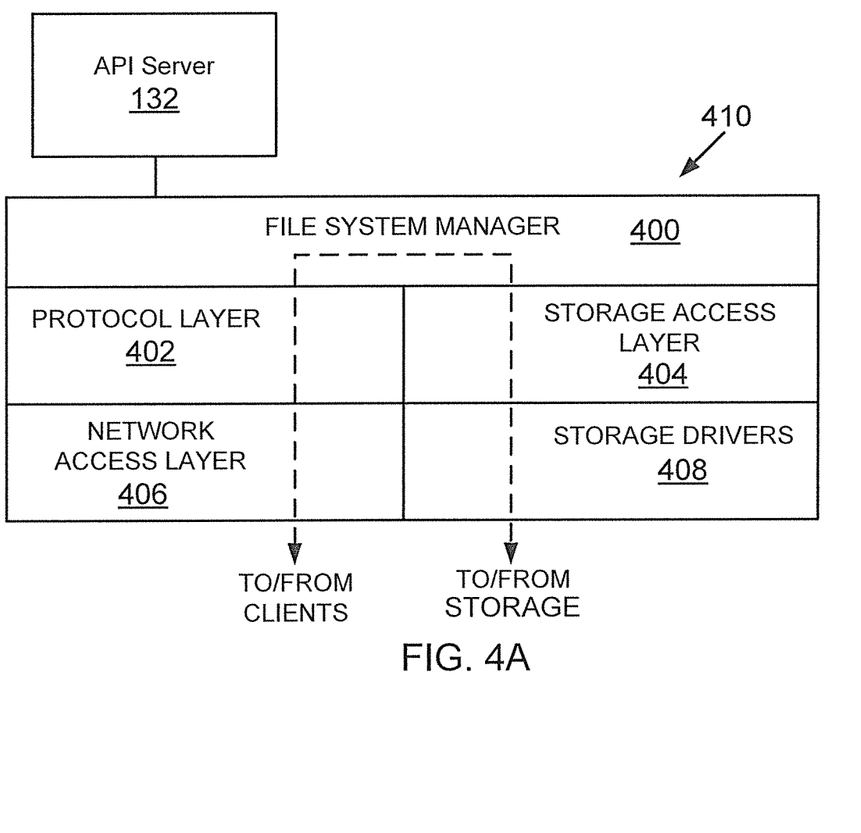
FIG. 4A shows an example of a storage operating system, used according to one aspect of the present disclosure.

Operating System:

FIG. 4A illustrates a generic example of storage operating system 410 (or 134, FIG. 1A) executed by node 208.1, according to one aspect of the present disclosure. The storage operating system 410 interfaces with API server 132 for providing information regarding different resources described above.

In one example, storage operating system 410 may include several modules, or "layers" executed by one or both of network module 214 and storage module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 410 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others.

Network access layer 406 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 410.

The storage operating system 410 may also include a storage access layer 404 and an associated storage driver layer 408 to allow storage module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information regarding storage volume, aggregate and various storage devices that is provided to adapter 160, when requested.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 4B:
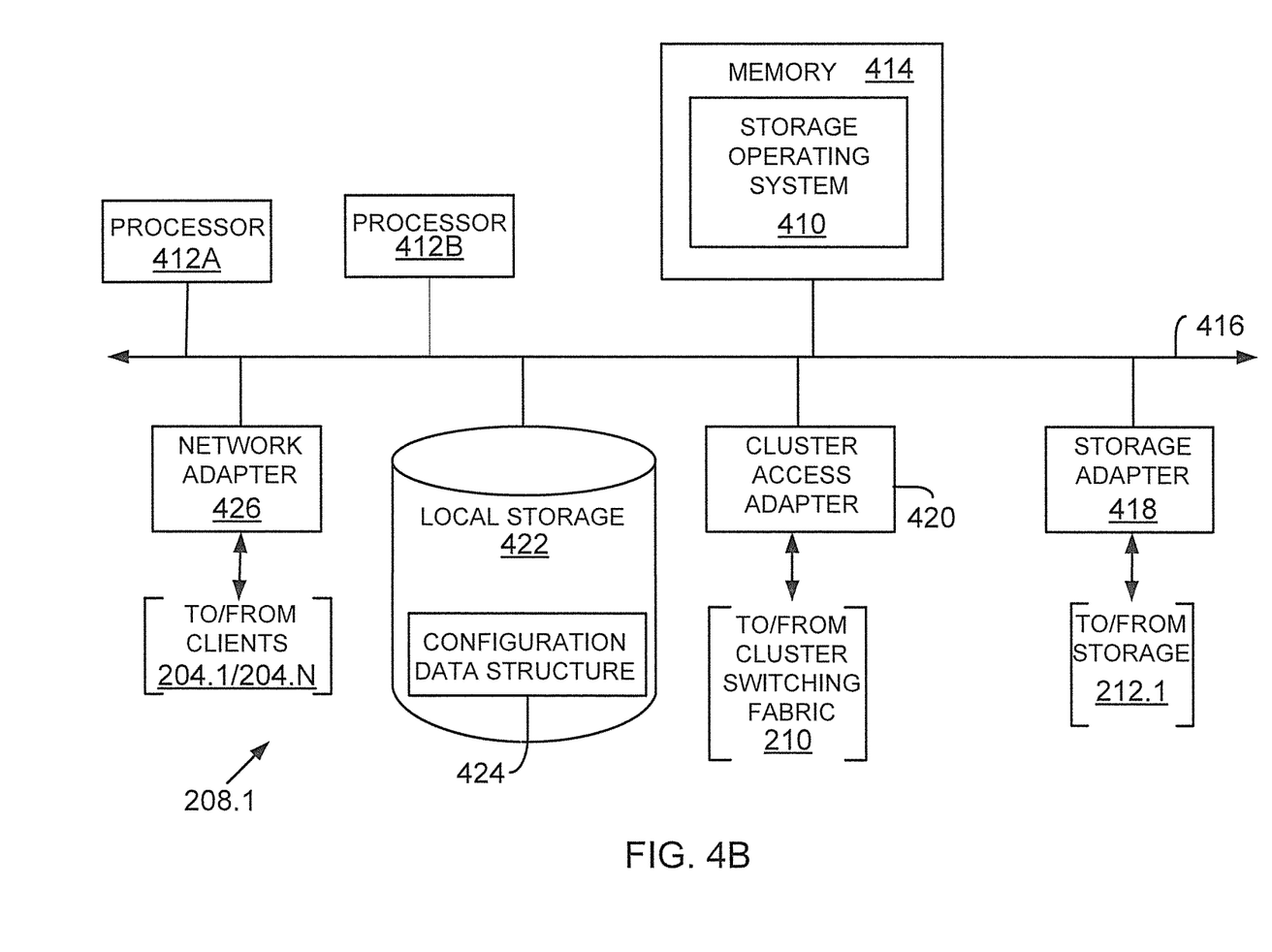
FIG. 4B shows an example of a storage system node, according to one aspect of the present disclosure.

Storage System Node:

FIG. 4B is a block diagram of a node 208.1 that is illustratively embodied as a storage system or a cluster node comprising of resources including a plurality of processors 412A and 412B, a memory 414, a network adapter 426, a cluster access adapter 420, a storage adapter 418 and local storage 422 interconnected by a system bus 416. Node 208.1 may be used to provide QOS and other information to API server 132 described above.

Processors 412A-412B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 422 comprises one or more storage devices utilized by the node to locally store configuration information for example, in a configuration data structure 424. The configuration information may include policy level information regarding storage volumes and their associated latency and throughput rates.

The cluster access adapter 420 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 420 is utilized by the network/storage module for communicating with other network/storage modules in the cluster 100.

Each node 208.1 is illustratively embodied as a dual processor storage system executing a storage operating system 410 (similar to 134, FIG. 1A) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 412A executes the functions of the network module 214 on the node, while the other processor 412B executes the functions of the storage module 216.

The memory 414 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 410 portions of which is typically resident in memory and executed by the processing elements, functionally organizes the node 208.1 by, inter alia, invoking storage operation in support of the storage service implemented by the node.

The network adapter 426 comprises a plurality of ports adapted to couple the node 208.1 to one or more clients 204.1/204.N over point-to-point links, wide area networks, virtual private networks implemented over a public network (Internet) or a shared local area network. The network adapter 426 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 418 cooperates with the storage operating system 410 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 418 comprises a plurality of ports having input/output (I/O) interface circuitry that couples to the storage devices over an I/O interconnect arrangement, such as a conventional high-performance, FC link topology.

Figure 5:
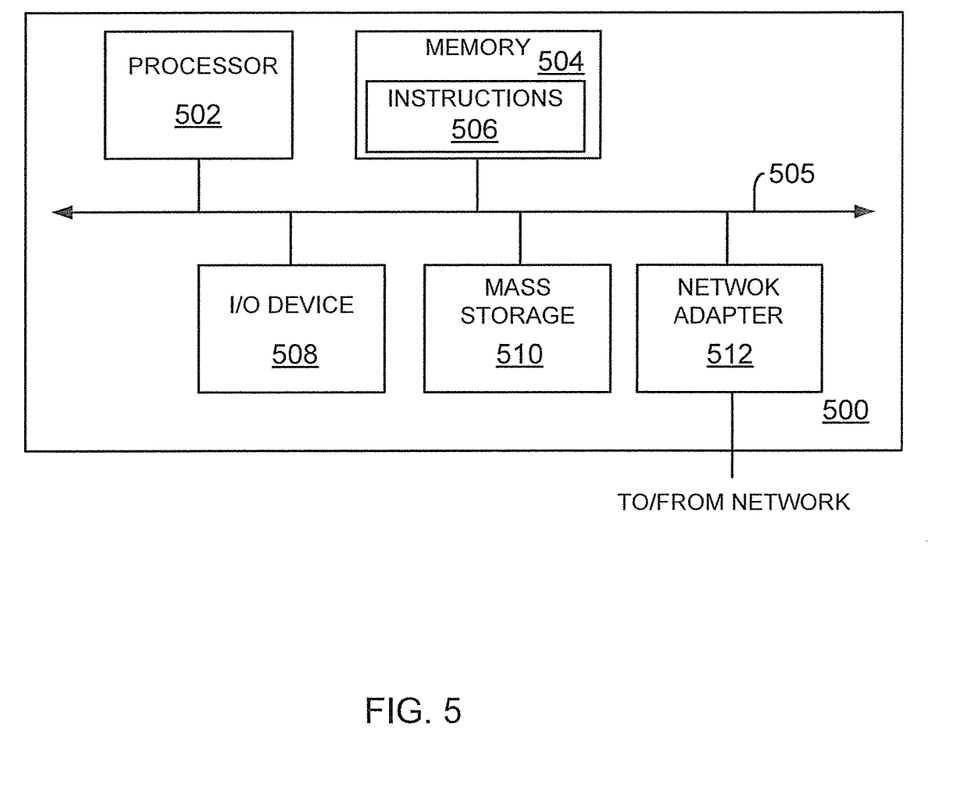
FIG. 5 shows an example of a processing system, used according to one aspect of the present disclosure.

Processing System:

FIG. 5 is a high-level block diagram showing an example of the architecture of a processing system 500 that may be used according to one aspect. The processing system 500 can represent host system 102, API server 132, monitoring console 128, clients 116 or 204, or storage system 108. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 3B and 3C (and class diagrams of FIGS. 3B-3C described above) may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Thus, a method and apparatus for providing information regarding resources of a networked storage environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
registering a resource model by a processor having a plurality of objects, each object representing a plurality of resources of a networked storage system in a same format for storing attributes of any resource type; wherein the resource model includes a plurality of relationship objects identifying relationship types for related resources of the plurality of resources;
using the resource model by the processor, to generate an empty output array for the plurality of resources by iteratively processing the relationship objects of the resource model, wherein the empty output array includes a placeholder link with a base value, and an attribute identifying related resources and relationship types, the placeholder link updated on demand for accessing information regarding any of the resources; and
dynamically populating the empty output array by the processor, in response to an application programming interface (API) request for information regarding a resource, by updating the placeholder link with a relationship attribute identifying a related resource and a relationship type such that a response to the API request by the processor provides access to information regarding the resource and the related resource.

2. The method of claim 1, wherein the request is received by an application programming interface (API) server that registers the resources model, creates the empty output array and dynamically populates the empty output array in response to the request.

3. The method of claim 2, wherein the empty output array is a hashmap that includes a uniform resource identifier link and a placeholder for a relationship attribute that is dynamically populated when the API server receives the request for information.

4. The method of claim 2, wherein a Representational State Transfer (REST) format is used to receive the request and provide the response by the API server.

5. The method of claim 1, wherein the resource model varies based on a storage platform type and component type used by the storage platform type.

6. The method of claim 1, wherein the relation type includes a composition type relationship, an aggregation type relationship and an association type relationship.

7. The method of claim 1, wherein the plurality of resources include an aggregate, storage volume and a storage virtual machine operating in a clustered storage environment.

8. A non-transitory, machine readable medium having stored thereon instructions comprising machine executable code which when executed by a machine, causes the machine to:
register a resource model by a processor having a plurality of objects, each object representing a plurality of resources of a networked storage system in a same format for storing attributes of any resource type; wherein the resource model includes a plurality of relationship objects identifying relationship types for related resources of the plurality of resources;
use the resource model by the processor, to generate an empty output array for the plurality of resources by iteratively processing the relationship objects of the resource model, wherein the empty output array includes a placeholder link with a base value, and an attribute identifying related resources and relationship types, the placeholder link updated on demand for accessing information regarding any of the resources; and
dynamically populate the empty output array by the processor, in response to an application programming interface (API) request for information regarding a resource, by updating the placeholder link with a relationship attribute identifying a related resource and a relationship type such that a response to the API request by the processor provides access to information regarding the resource and the related resource.

9. The non-transitory, storage medium of claim 8, wherein the request is received by an application programming interface (API) server that registers the resources model, creates the empty output array and dynamically populates the empty output array in response to the request.

10. The non-transitory, storage medium of claim 9, wherein the empty output array is a hashmap that includes a uniform resource identifier link and a placeholder for a relationship attribute that is dynamically populated when the API server receives the request for information.

11. The non-transitory, storage medium of claim 9, wherein a Representational State Transfer (REST) format is used to receive the request and provide the response by the API server.

12. The non-transitory, storage medium of claim 8, wherein the resource model varies based on a storage platform type and component type used by the storage platform type.

13. The non-transitory, storage medium of claim 8, wherein the relation type includes a composition type relationship, an aggregation type relationship and an association type relationship.

14. The non-transitory, storage medium of claim 8, wherein the plurality of resources include an aggregate, storage volume and a storage virtual machine operating in a clustered storage environment.

15. A system, comprising:
a memory containing machine readable medium comprising machine executable code having stored thereon instructions; and a processor coupled to the memory, the processor configured to execute the machine executable code to:
register a resource model by a processor having a plurality of objects, each object representing a plurality of resources of a networked storage system in a same format for storing attributes of any resource type; wherein the resource model includes a plurality of relationship objects identifying relationship types for related resources of the plurality of resources;
use the resource model by the processor, to generate an empty output array for the plurality of resources by iteratively processing the relationship objects of the resource model, wherein the empty output array includes a placeholder link with a base value, and an attribute identifying related resources and relationship types, the placeholder link updated on demand for accessing information regarding any of the resources; and
dynamically populate the empty output array by the processor in response to an application programming interface (API) request for information regarding a resource, by updating the placeholder link with a relationship attribute identifying a related resource and a relationship type such that a response to the API request by the processor provides access to information regarding the resource and the related resource.

16. The system of claim 15, wherein the request is received by an application programming interface (API) server that registers the resources model, creates the empty output array and dynamically populates the empty output array in response to the request.

17. The system of claim 16, wherein the empty output array is a hashmap that includes a uniform resource identifier link and a placeholder for a relationship attribute that is dynamically populated when the API server receives the request for information.

18. The system of claim 16, wherein a Representational State Transfer (REST) format is used to receive the request and provide the response by the API server.

19. The system of claim 15, wherein the resource model varies based on a storage platform type and component type used by the storage platform type.

20. The system of claim 15, wherein the relation type includes a composition type relationship, an aggregation type relationship and an association type relationship.

* * * * *